Sept. 21, 1948.

G. F. JOHNSON 2,449,944

METHOD OF ASSEMBLING ROLLER BEARINGS
AND LOCK RINGS THEREFOR
Filed April 25, 1945

Inventor
Glen F. Johnson
Barthel & Bugbee
Attorneys

Patented Sept. 21, 1948

2,449,944

UNITED STATES PATENT OFFICE 2,449,944

METHOD OF ASSEMBLING ROLLER BEARINGS AND LOCK RINGS THEREFOR

Glen F. Johnson, Detroit, Mich., assignor to Bower Roller Bearing Company, Detroit, Mich., a corporation of Michigan Application April 25, 1945, Serial No. 590,284

3 Claims. (Cl. 29—148.4)

The present invention relates to roller bearing assemblies and more particularly, to a method for making the same.

The primary object of the invention is to provide a method for assembling locking and retaining rings in the race members of a roller or anti-friction bearing structure to thereby hold the bearing structure in assembled relation.

Another object of the invention is to provide a method for shrinking a retaining or locking ring in a recess in one of the race members of a bearing assembly to hold the race members and anti-friction bearing elements in position between the race members of said bearing assembly or structure.

Another object of the invention is to provide a method for making bearing assemblies, including inner and outer race members having anti-friction elements therebetween which are adapted to be held or retained in position by means of a retaining or locking ring which is supported on a carrier and heated to a predetermined temperature before being placed in position so that after said retaining or locking ring is moved to registry with an annular groove in one of the race members, it may be quenched to cause the same to shrink and become permanently set and seated in said groove.

Another object of the invention is to provide a method for shrinking a retaining and locking ring in an annular groove formed in one of said race members to hold the bearing structure in assembled relation and to provide an end thrust wall for the roller bearing or anti-friction element arranged between the race members so that the bearing will be adapted for use where an end thrust is imposed on the bearing structure as well as a radial thrust.

Another object of the invention is to provide a bearing structure of the above-mentioned character in which one edge or end of at least one of the race members is provided with an annular recess instead of a roller bearing or anti-friction element engaging shoulder so that said end portion may be machined for permitting the passage of a retaining and locking ring thereover to a position in which the locking and retaining ring is in registry with an annular groove in said machined surface so that shrinking of the locking and retaining ring may be accomplished to seat the same in said annular groove and thereby lock the bearing structure in assembled relation.

Another object of the invention is to provide a method for forming roller bearing and anti-friction bearing structures which consists in placing the inner and outer race members of the bearing structure upon a suitable support with the machined and grooved surface of one of the race members uppermost so that the locking and retaining ring may be carried by a movable support disposed thereabove in such a manner that the ring may be lowered in position upon the machined and grooved surface of said race member while at the same time being heated to a temperature of approximately 1500 degrees Fahrenheit so as to cause expansion of the ring prior to the lowering thereof on the machined surface, after which it is quenched and caused to seat in the annular groove upon contraction after being quenched.

Another object of the invention is to provide a bearing structure and method of forming the same in which the inner race member has one of its ends machined and grooved for receiving the continuous locking and retaining ring which is formed of a suitable steel having an inner diameter such that when the ring is heated it will be expanded to a dimensional size to permit the same to be slid over the machined surface of said inner race member so that it may be brought into registry with the annular groove and upon cooling by quenching will shrink and be seated in said groove.

Other objects and advantages of the invention will become apparent during the course of the following description of the accompanying drawings, wherein.

Figure 3:
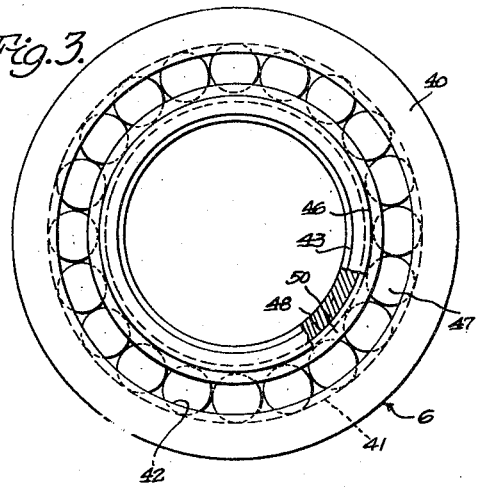
Figure 3 is a side elevational view of a bearing structure constructed in accordance with the present invention and showing the manner in which the continuous locking ring is seated in the annular groove in the inner race member so that contactual engagement is had with the bottom wall of the groove and the inner diameter of the locking ring throughout the entire circumference thereof.
Figure 4:
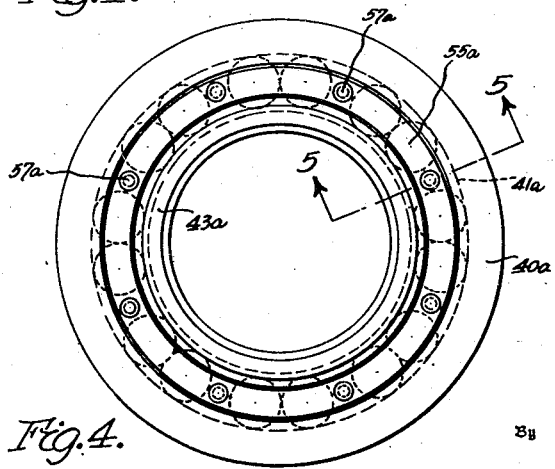
Figure 5:
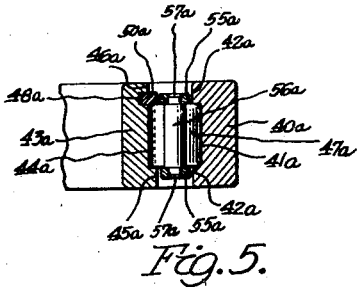

Figure 4 is a side elevational view of a roller bearing structure of a slightly modified form wherein the roller bearings are supported by a bearing cage instead of being freely mounted, as shown in Figure 3; and Figure 5 is a radial cross-sectional view taken on line 5—5 of Figure 4, showing the manner in which the continuous locking ring is arranged so as to provide sufficient clearance for one of the annular members of the bearing cage.

*Detailed description of the invention*

Figure 1:
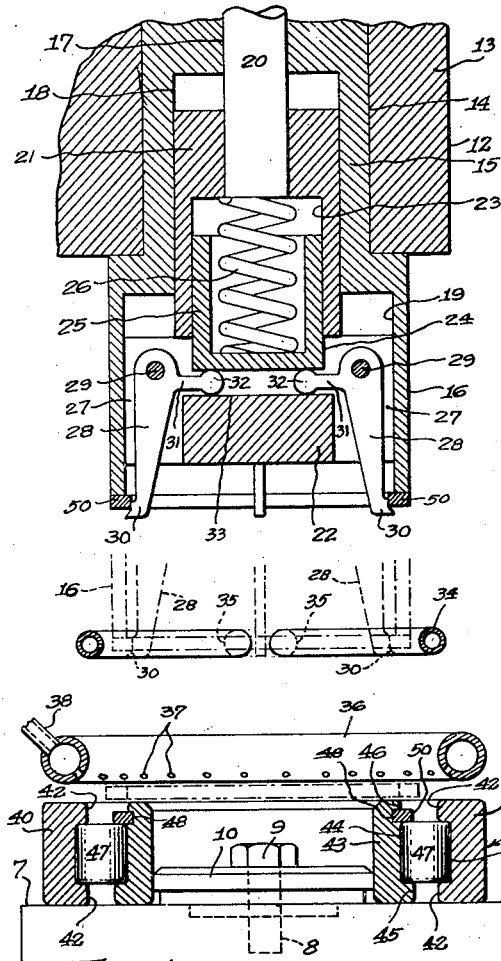
Figure 1 is a fragmentary vertical sectional view of one form of apparatus which may be used for carrying out the method and process of forming the bearing structure and assembling the locking ring in one of the race members of the bearing structure to retain the bearing structure in assembled relation.
Figure 2:
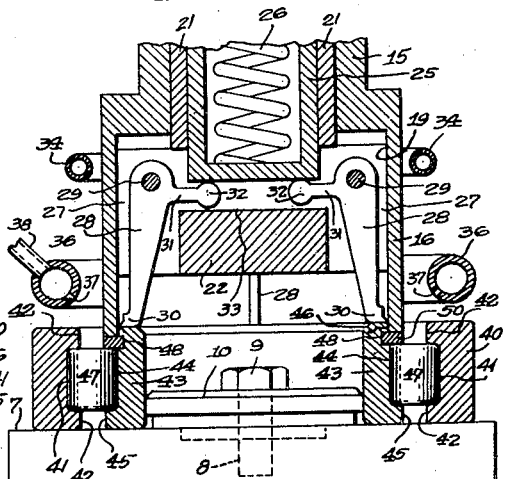
Figure 2 is a fragmentary vertical cross sectional view similar to Figure 1, showing the manner in which the continuous locking ring is moved downwardly into position with respect to one of the race members of the bearing structure to illustrate the ring seated within the annular groove in said race member after quenching.

Referring to the drawings in detail, Figures 1 to 3 inclusive show an apparatus for carrying out the invention having a bed 5 for supporting a roller bearing assembly 6. The top wall 7 of the bed 5 is threaded as at 8 for receiving a centering stud 9 and a centering disc 10. By removing the stud 9, centering discs 10 of various diameters may be substituted so as to accommodate bearing structures having different inner diameters.

The head 12 of the machine is supported on the base 5 by means of a U-shaped extension or the like (not shown) and said head includes a body portion 13 having a bore 14 for receiving a movable plunger 15. Suitable mechanism for moving the plunger 15 in a reciprocal manner may be provided so as to cause the lower enlarged end portion 16 to move downwardly as indicated by the dotted line in Figure 1.

The plunger 15 is provided with a bore 17 extending longitudinally thereof which is enlarged as at 18 and further enlarged as at 19. A reciprocating shaft 20 is slidably mounted in the bore 17 and said shaft has its lower end connected to a reciprocating member 21 slidably mounted in the bore 18. Formed integral with the reciprocating member 21 on the lower end thereof is a foot or enlarged portion 22 which is likewise slidably movable in the bore 19. The reciprocating member 21 and foot 22 are provided with aligned bores 23 and 24 for receiving a cup-shaped plunger 25 which is yieldingly urged downwardly toward the foot 22 by means of the coil spring 26 which has one end arranged in abutting relation with one end of the shaft 20 and its opposite end abutting the bottom wall of the cup-shaped plunger 25. Formed in the foot member 22 is a series of 90 degree spaced radially extending slots 27 for receiving jaw members 28 which are pivoted as at 29 and have their lower ends fashioned and shaped to provide gripping jaws 30. The radial slots 27 intersect the bore 24 so that arm projections 31 may extend into said bore with their enlarged head portions 32 in engagement with the bottom wall of the spring-pressed plunger 25. Thus it will be seen that the cup-shaped plunger 25 will retain the enlarged portion 32 of the lever arm 31 yieldingly against the floor 33 of the bore 24 but yet permit the jaw members 28 to rock about their pivot points 29 and swing inwardly against the yielding action of the cup-shaped spring-pressed plunger 25.

Also supported by the machine frame between the base 5 and head 12 is an induction heating element 34 of circular shape and size to permit the free passage of the enlarged portion 16 of the plunger 15 as indicated by the dotted lines in Figure 1. The electrical induction heater 34 may be provided with radially extending cable connections 35 for connection with a suitable source of electrical energy and control mechanism such as a rheostat or the like so that the temperature may be regulated to heat the continuous locking and retaining ring to predetermined temperature.

Supported above the base 5 and disposed below the induction heating element 34 is a quenching tube 36 of ring-like formation and a series of jet openings 37 is formed in the quenching tube 36 to direct a jet of water downwardly and inwardly on the continuous locking and retaining ring after the same has been placed in position on one of the bearing race members. The annular quenching tube 36 is connected to a suitable source of liquid supply by means of a feed pipe 38, and in the event that it is desired to water-quench the continuous locking and retaining ring, the pipe 38 may be connected to a suitable water supply, while if it is desired to oil-quench the ring, the pipe may be connected to a source of quenching oil contained in a tank or the like.

The bearing structure 6 shown in Figures 1 to 3 inclusive includes an outer race member 40 having the inner surface machined to provide a raceway 41 and abutment shoulders 42 at each end thereof. The inner race member 43 is similarly machined as at 44 to provide a raceway and an abutment shoulder 45 at one end thereof and a portion 46 at the other end thereof of a slightly smaller diameter than the machined surface forming the raceway 44. Antifriction roller bearings or elements 47 are arranged between the raceways 41 and 44 and said roller bearings may be assembled in the raceways 41 first so that the inner raceways 43 may be next assembled to retain the anti-friction roller bearing elements 47 in place until the continuous locking ring is seated in an annular groove 48 formed in the machined surface 46 of reduced diameter.

The annular retaining and locking ring 50 is formed of metal such as steel, and the inner diameter of said ring 50 is of such a size that when the continuous locking ring is heated to a predetermined temperature, the same will be expanded so that the ring may easily slide over the machined surface 46 of the inner race member 43. Since the continuous retaining and locking ring 50 is heated to a suitable temperature to cause expansion thereof, the ring upon cooling by quenching will be shrunk and simultaneously hardened.

*Modified form of the bearing structure*

As shown in Figures 4 and 5, the outer bearing race member 40a is machined with a raceway 41a to provide roller bearing abutting shoulders 42a at each end thereof. The inner race member 43a is likewise machined as at 44a to provide a raceway and an abutting shoulder 45a at one end thereof. The other end of the inner race member is machined as at 46a to provide a diameter slightly smaller than the diameter of the raceway 44a and as is the case in the form of the invention shown in Figures 1 and 3, the machined surface 46a and raceway 44a is interrupted by an annular groove 48a. The continuous locking ring 50a is formed of a metal such as steel and may be stamped or otherwise shaped to provide a ring of a relatively small section of substantially the same shape as the annular groove 48a. The roller bearings 47a are carried by a roller bearing cage and disposed between a pair of ring members 55a secured together at circumferentially spaced annular distances by means of retaining pins 56a having the ends reduced and riveted in place by being upset as at 57a. The roller bearings 47a are held between the cage rings 55a by mutually engaging projections and recesses at the ends of the bearing members or rollers 47a and the inner surface of the bearing cage rings 55a.

*Operation of the invention and method of assembling the bearing parts and locking ring*

As shown in Figures 1 to 3 inclusive, the locking ring 50 is supported on the jaw portions 30 of the jaw levers 28 by being received in notched portions thereof, and when the ring is in position as shown in Figure 1, the top surface thereof is engaged by the enlarged portion 16 of the plunger 15. It is to be understood that the bearing assembly including the outer race member 40 and the inner race member 43 with the anti-friction roller bearings 47 therebetween is placed on the top surface 7 of the support or bed 5 with the centering disc 10 received in the opening in the inner race member.

After the continuous locking and retaining ring 50 and bearing structure have been placed in position as shown in Figure 1, the plunger 15 and reciprocating shaft 20 are simultaneously moved downwardly by suitable control mechanism (not shown) to a position as indicated in dotted lines (Figure 1) wherein the continuous locking and retaining ring 50 is arranged within the confines of the electric induction heating ring 34 so that the heat therefrom will be transmitted to the locking ring 50. By reason of the small sectional size of the locking ring 50, the same can be heated to a temperature of approximately 1500 degrees Fahrenheit in a relatively short time so as to cause the ring to expand to a circular size with an inner diameter slightly greater than the reduced diameter 46 of the inner race member 43. After the ring 50 has been held in a position as shown by the dotted lines in Figure 1 for a predetermined length of time, the reciprocating plunger 15 is again moved downwardly so as to carry the continuous locking and retaining ring 50 in its expanded condition to a position in alignment with the reduced machined surface 46 of the interlocking ring 43. As indicated in Figure 1, in the above-mentioned position, the locking ring 50 has been expanded so that the inner surface will slide over the machined surface 46 of the inner race member 43 and in doing so, will cause the ring to be displaced from the jaw portion 30 of the jaw levers 28. That is to say, upon further downward movement of the reciprocating plunger 15, the lower end of the enlarged portion 15 thereof will exert a pressure on the upper wall thereof, and since the lower faces of the jaw portions 30 will engage the end portion of the inner race member 43, as shown in Figure 2, the locking ring will be brought into registry with the annular recess or groove 48 in the machined surface 46. Thus, the ring is released from the jaw portions 30 of the jaw levers 28 and the reciprocating plunger 15 may then be moved upwardly to the limit of its upward travel as shown in Figure 1 so that the ring 50 may be quenched and cooled to room temperature by the inwardly and downwardly directed jets of cooling liquid from the circular quenching tube 36. Upon quenching, the continuous locking and retaining ring 50 is returned to its normal size and in so doing, is shrunk into the recess 48 so as to be permanently set and seated therein. By reason of the fact that the continuous locking and retaining ring is quickly cooled to room temperature, a relatively hard structure results.

When the continuous locking ring 50 is in place, one of the walls thereof is in engagement with the radial walls of the series of roller bearing or anti-friction elements 47 so as to form an abutment shoulder therefor and permit the completed bearing unit to be used where both radial and axial thrusts exist, and as shown in Figure 3, the continuous locking ring 50 is fully seated in the annular groove 48 about the entire circumference of the floor of said groove.

When assembling the modified bearing structure shown in Figures 4 and 5, the inner and outer race members thereof are placed upon the bed or support 5 with the anti-friction bearing rollers 47a therebetween in substantially the same manner as pointed out and described in connection with the form of the invention shown in Figures 1 to 3 inclusive. The continuous locking and retaining ring 50a is supported by the jaw portions 30 of the jaw levers 28 and is carried downwardly by the plunger 15 to a position in registry with the electrical induction heater 34 so that the ring will be heated to a temperature of approximately 1500 degrees Fahrenheit. The ring is then moved downwardly in the same manner as described in connection with the form of the invention shown in Figures 1 to 3 inclusive, and is to be noted that the bearing cage ring members 55a are of such sectional size as to permit the expanded ring to be slid over the machined surface 46a and to a position in registry with the slot 48a on the inner side of one of the bearing cage ring 55a. After the continuous locking and retaining ring 56a has thus been placed in registry with the annular recess 48a, the plunger 15 is elevated as above described and the ring is cooled to room temperature by being subjected to the downwardly and inwardly directed jets of cooling liquid from the circular quenching tube 36.

It is to be understood that in both bearing structures, Figures 3 and 4, the locking ring is substantially the same in composition as well as shape and that the same process and method of assembling the continuous locking ring 50 in Figure 3 and 50a in Figure 4 is used for both cases.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. A method of assembling a continuous annular retaining ring of thermally-expansible material in mating relationship with a correspondingly configured recess in one of the race members of an anti-friction bearing unit, comprising forming said recess and the mating surface of said retaining ring with diametral dimensions which are substantially equal at substantially the same room temperature, moving said ring into an electrical induction heating zone spaced away from said race members, thermally expanding said ring in said induction heating zone by heating said ring to a predetermined temperature at which said ring will expand sufficiently to clear the recessed race member, moving the thus-heated and expanded ring out of said heating zone and relatively to the recessed race member into registry with said recess, and cooling said ring while holding said ring in such registry whereby to shrink said ring into seating and mating engagement with said recess.

2. A method of assembling a continuous annular retaining ring of thermally-expansible material in mating relationship with a correspondingly configured recess in one of the race members of an anti-friction bearing unit, comprising forming said recess and the mating surface of said retaining ring with diametral dimensions which are substantially equal at substantially the same room temperature, moving said ring into an electrical induction heating zone spaced away from said race members, thermally expanding said ring in said induction heating zone by heating said ring to a predetermined temperature at which said ring will expand sufficiently to clear the recessed race member, moving the thus-heated and expanded ring out of said heating zone and relatively to the recessed race member into registry with said recess, and applying a coolant to said ring at peripherally spaced locations thereon to quench said ring while holding said ring in such registry whereby to shrink said ring into seating and mating engagement with said recess.

3. A method of assembling a continuous annular retaining ring of thermally expansible material in mating relationship with a correspondingly configured recess in one of the race members of an anti-friction bearing unit, comprising forming said recess in the external peripheral surface of the inner race member with a diametral dimension which is substantially equal to the diametral dimension of the inner surface of said ring at substantially the same room temperature, moving said ring into an electrical induction heating zone spaced away from said race members, thermally expanding said ring in said induction heating zone by heating said ring to a predetermined temperature at which said ring will expand sufficiently to clear said inner race member, sliding the heated and expanded ring out of said heating zone and axially over said inner race member into registry with said recess, and applying a coolant to said ring to quench said ring while holding said ring in such registry whereby to shrink said ring into seating and mating engagement with said recess.

GLEN F. JOHNSON.

REFERENCES CITED

The following references are of record in the file of this patent:

UNITED STATES PATENTS

| Number | Name | Date |
|---|---|---|
| 746,440 | Austin | Dec. 8, 1903 |
| 1,350,325 | Miller | Aug. 24, 1920 |
| 1,387,830 | Bingham | Aug. 16, 1921 |
| 1,387,881 | Bingham | Aug. 16, 1921 |
| 1,621,095 | Utter | Mar. 15, 1927 |
| 1,630,339 | Ganster | May 13, 1927 |
| 1,687,343 | Madden | Oct. 9, 1928 |
| 1,758,653 | Cramer | May 13, 1930 |
| 1,991,723 | Betz | Feb. 19, 1935 |
| 2,144,928 | Moncrief | Jan. 24, 1939 |
| 2,385,542 | Rippingille | Sept. 25, 1945 |